March 9, 1926.                J. DE MARTI                1,576,238
                              ALARM DEVICE
                           Filed April 13, 1925
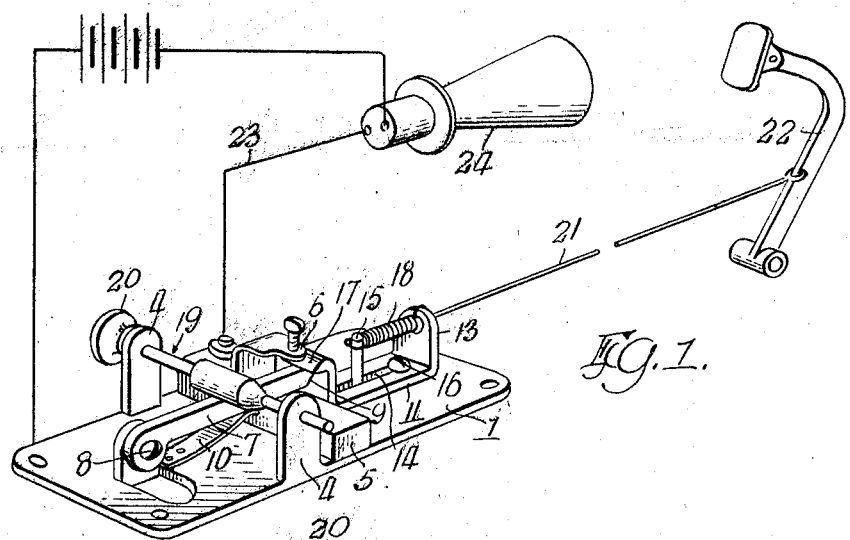
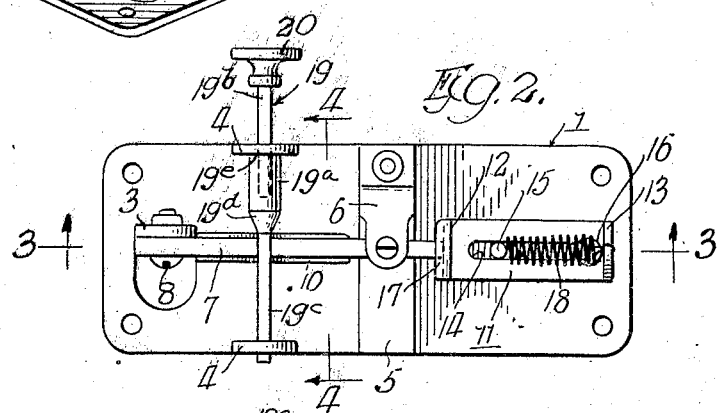
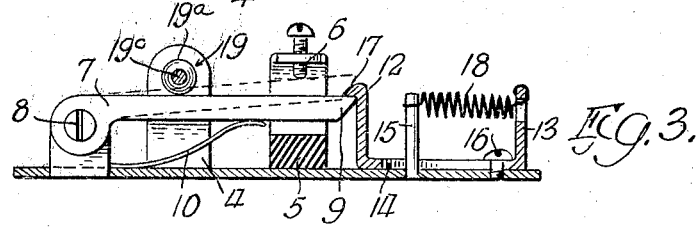
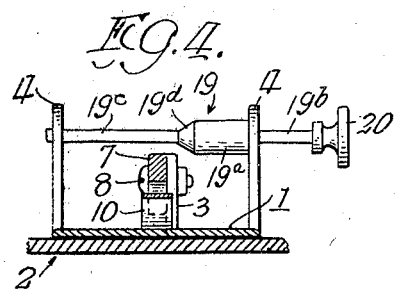
Inventor
Joseph De Marti
by ⟨signature⟩ Atty.

Patented Mar. 9, 1926.

1,576,238

UNITED STATES PATENT OFFICE.

JOSEPH De MARTI, OF CHICAGO, ILLINOIS.

ALARM DEVICE.

Application filed April 13, 1925. Serial No. 22,507.

*To all whom it may concern:*

Be it known that I, JOSEPH DE MARTI, a citizen of the United States, and a resident of Chicago, county of Cook, and State of Illinois, have invented certain new and useful Improvements in Alarm Devices, of which the following is a specification.

This invention relates to improvements in alarm devices and consists of the matters hereinafter described and more particularly pointed out in the appended claims.

The primary object of the invention is to provide a small and efficient device which may be easily positioned in some secret place upon an automobile and may be so connected to a movable part thereof as to produce an alarm, either audible or visible when the automobile is started by an unauthorized person.

A further object of the invention is to produce such a device that includes a means for setting the parts thereof and for holding them in an inoperative position even under the jolting or jarring it receives in the use of the automobile and which device may be readily manipulated in an instant so that it will be operative for its intended purpose.

These objects of the invention, as well as others, together with the many advantages thereof will more fully appear as I proceed with my specification.

In the drawings:

Fig. 1 is a perspective view of an alarm device embodying my invention, showing it in diagram as connected up to several of the parts of an automobile to which it has been applied.

Fig. 2 is a top plan view of the device.

Fig. 3 is a longitudinal section through the same on the line 3—3 of Fig. 2.

Fig. 4 is a transverse vertical section through the same on the line 4—4 of Fig. 2.

My improved alarm device is in the form of a switch mechanism intended to be positioned in some secret and out of the way place on an automobile, known only to the owner thereof and includes a fixed and a movable contact connected up with say the signal horn of the automobile and to a part to be operated when starting the automobile as for instance the clutch pedal, so that when the automobile is started by an unauthorized person, the signal is sounded continuously, thus notifying not only those in authority but others that the automobile is thus being started.

Referring now in detail to that embodiment of the invention illustrated in the accompanying drawings, the improved device includes a rectangular base plate 1 which may be secured to a fixed part of the automobile as for instance one of the frame members 2 thereof as indicated in Fig. 4. Said base plate is made of metal and includes an outstanding ear 3 located on the median line of the plate near one end thereof and stamped up from the metal thereof and a pair of outstanding ears 4—4 at the sides of the plate midway between its ends. Between said pair of ears and the other end of said base plate is fixed a transversely extending block of insulation 5 upon which is mounted a fixed contact plate having an end 6 offset or spaced from the said insulation block.

7 indicates the movable contact element in the form of a lever pivot at one end as at 8 to the ear 3 and extending at its other end 9 into the space between the said insulation block and offset end of the fixed contact. A leaf spring 10 is fixed at one end to the base plate in the plane of the movable contact member and engages at its other end with said contact lever 7 in a manner normally urging it into engagement with the fixed contact member. Releasable means is provided to hold the movable contact out of engagement with the fixed contact member against the action of the spring 10 and such means is as follows: On that end of the base plate to which the insulation block is fixed and in the median line of said plate is mounted a longitudinally movable or shiftable latch plate 11 having upturned inner and outer ends 12 and 13, respectively. In said plate is provided a longitudinally extending slot 14. A pin 15 fixed in said base plate extends through said slot and a screw 16 also extends through said slot and is threaded into the base plate. Said pin and screw act in conjunction with the slot to limit the longitudinal movement of the latch plate on the base plate and at the same time prevent separation between said plates. The upturned inner end 12 of the latch plate is formed to provide an angular tooth 17 which is adapted to engage the associated end 9 of the movable contact 7 to hold the same out of engagement with the fixed contact. A contractile helical spring 18 connects the pin 15 and latch plate end 13 and acts to normally urge the latch plate toward said movable contact member. The free end 9 of the movable contact member or lever 7 is also made angular so that when said lever is depressed as will later appear, it will engage the angular tooth 17 of the latch plate and force the same outwardly against the action of the spring 18 so that it may pass and then engage under the same. Instead of making the pin 15 separate from the base plate, it may be formed by punching out a part of the base plate and then bending it upwardly to act for all purposes the same as said pin 15.

To depress the contact lever 7 inwardly against the action of its spring 10 so that it will engage under the tooth 17 of the latch plate, I provide a simple and novel means now to be described. Journalled in the pair of ears 4—4 is a setting pin 19 which includes an enlarged cylindrical body portion 19$^a$ and end portions 19$^b$ and 19$^c$ of reduced diameter which have bearing in suitable openings provided therefor in said ears 4—4. The body portion 19$^a$ meets the end portion 19$^c$ by means of a tapered portion or cam 19$^d$ and the said body portion meets the other end portion 18$^c$ by means of an abrupt shoulder 19$^e$ and to said end portion 19$^b$ outside of and beyond the associated ear is fixed a knob 20 by which said setting pin may be manipulated or moved in an endwise direction. The various parts of the setting pin are so arranged that when the shoulder 19$^e$ is engaged against its associated bearing ear 4 the cam portion 19$^d$ is spaced laterally to one side of the plane of the movable contact lever 7 so that when said lever is released by the latch plate 11 it may swing away from the base plate into engagement with the fixed contact 6. When the setting pin is moved inwardly, its cam portion 19$^d$ will engage said lever and force it toward the base plate and its end 9 will pass the latch plate tooth 17 to engage beneath the same, the body portion 19$^a$ then riding upon said lever. Should it be desired, the setting pin may now be returned to its normal position so that the movable contact member may swing upwardly when released.

The outer end of the latch plate is connected by a flexible member or cable 21 to a part of the automobile which is actuated when the automobile is to be started as for instance, the starter button or as shown herein the clutch pedal 22. With the fixed contact 6 connected by a wire 23 to the electrical circuit of the horn 24 of the automobile and grounded on the frame 2 the operation will be as follows:—

When the owner desires to drive his automobile he pushes the setting pin 19 inwardly so that the body thereof holds the movable contact 7 away from the fixed contact, the spring 10 acting to impose enough pressure upon the contact lever 7 to prevent moving of the pin out of this position due to the jolting or jarring of the automobile when under way. This permits free use of the clutch pedal and attending movement of the latch plate without in any manner permitting engagement of the movable contact lever with the fixed contact member. Now assume that the driver has "parked" his car:—He then pulls outwardly on the setting pin 19 leaving the movable contact engaged under the tooth of the latch plate. Should an unauthorized person attempt to drive the automobile, he, of course, must operate the clutch pedal. In operating the clutch pedal he unknowingly moves the latch plate 11 and releases the movable contact lever 7 which under the action of the spring 10 immediately engages the fixed contact 6 and closes the circuit to the signal. The unauthorized person hearing the signal, and not knowing how or what to do to stop the same will become startled at the attention attracted to the automobile and will most likely abandon the same. The owner can then reset the device by pushing the setting pin inwardly.

The device comprises but a few parts which are strong and rigid and which are so arranged that they cannot readily get out of order. While in describing my invention, I have referred to the same as used in connection with an automobile but this is for illustration only because as is apparent it may also be used in connection with other objects when its peculiar characteristics makes it advantageous to do so.

I claim as my invention:

1. A device of the kind described embodying therein, a base, a fixed contact thereon, a swingable contact lever pivotally mounted on the base to swing toward and away from the fixed contact, means urging said contact lever toward said fixed contact, a latch member carried on said base for longitudinal movement and adapted to engage the movable contact lever to hold it out of engagement with the fixed contact, and a device extending transversely to the movement of the movable contact lever and capable of an endwise movement in one direction for setting said lever under the latch member and holding said lever out of engagement with the fixed contact when released by the latch, said device when moved endwise in the other direction permitting said lever to engage the fixed contact when released by said latch.

2. A device of the kind described embodying therein, a base, a fixed contact thereon, a swingable contact lever pivotally mounted on the base to swing toward and away from the fixed contact, means urging said contact lever toward said fixed contact, a latch member carried on said base for longitudinal movement and adapted to engage the movable contact lever to hold it out of engagement with the fixed contact, and an endwise movable setting pin mounted on the base for movement transverse of the contact lever and including a cam portion, said cam portion acting in one endwise movement of the setting pin to engage said lever and force it under the latch and to hold said lever away from the fixed contact even when released by said latch, said cam acting when the pin is moved in the other direction to permit said contact lever to engage the fixed contact when released by said latch.

3. A device of the kind described embodying therein, a base, a fixed contact thereon, a swingable contact lever pivotally mounted on one end of the base to swing toward and away from the fixed contact, means urging said contact lever toward said fixed contact, a latch plate longitudinally movable on said base and having upturned ends and a longitudinal slot between said ends, means including a pin on said base extending through said slot and providing a limited guided movement of the latch plate on the base toward and away from the fixed contact, that upturned end of the latch plate adjacent the fixed contact having a tooth under which the free end of the contact lever is adapted to engage, a spring connecting said pin and the other end of the latch plate and a device mounted on the base and extending across the lever and capable of being actuated for either holding said lever when released from the latch plate tooth or permitting said lever to engage the fixed contact when released by said latch.

4. A device of the kind described, embodying therein a base plate having a pair of upturned ears at its sides between its ends and a third upturned ear at one end between its sides, a fixed contact mounted on and extending transversely of said base plate and offset away and insulated therefrom, a contact lever pivoted at one end to said third ear and having its other and free end arranged under said contact, a spring normally urging said contact lever into engagement with said fixed contact, a latch plate capable of a limited yielding longitudial guided movement on the other end of the base plate toward and away from said fixed contact and having a tooth to engage the associated end of said contact lever, and means arranged in said pair of ears for endwise movement and extending transversely of the contact lever and capable of being actuated to either hold said contact lever away from the fixed contact when released by said latch plate or to permit said lever to engage the fixed contact when released by said latch plate.

In testimony whereof, I have hereunto set my hand, this 10th day of April, 1925.

JOSEPH De MARTI.